(12) United States Patent
Kouno et al.

(10) Patent No.: US 9,186,791 B2
(45) Date of Patent: Nov. 17, 2015

(54) MOBILE ROBOT AND MOBILE TRUCK

(71) Applicant: KABUSHIKI KAISHA YASKAWA DENKI, Kitakyushu-shi (JP)

(72) Inventors: Dai Kouno, Kitakyushu (JP); Tetsuro Izumi, Kitakyushu (JP); Tamio Nakamura, Kitakyushu (JP); Takashi Nishimura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 103 days.

(21) Appl. No.: 14/201,933

(22) Filed: Mar. 10, 2014

(65) Prior Publication Data

US 2014/0188323 A1    Jul. 3, 2014

Related U.S. Application Data

(63) Continuation of application No. PCT/JP2012/072898, filed on Sep. 7, 2012.

(30) Foreign Application Priority Data

Sep. 13, 2011  (JP) .................................. 2011-199872

(51) Int. Cl.
| | |
|---|---|
| *B25J 5/00* | (2006.01) |
| *B25J 9/16* | (2006.01) |
| *B25J 13/08* | (2006.01) |

(52) U.S. Cl.
CPC ........ *B25J 5/007* (2013.01); *B25J 9/162* (2013.01); *B25J 9/1633* (2013.01); *B25J 13/083* (2013.01); *B25J 13/085* (2013.01); *Y10S 901/01* (2013.01)

(58) Field of Classification Search
CPC .......... B25J 5/007; B25J 9/162; B25J 9/1633; B25J 13/083; B25J 13/085; Y10S 901/01
See application file for complete search history.

(56) References Cited

U.S. PATENT DOCUMENTS

| | | | | |
|---|---|---|---|---|
| 4,925,312 | A  * | 5/1990  | Onaga et al. | ................... 700/261 |
| 5,239,246 | A  * | 8/1993  | Kim | ......................... 318/568.11 |
| 5,994,864 | A  * | 11/1999 | Inoue et al. | ................ 318/568.2 |
| 7,443,115 | B2 * | 10/2008 | Okamoto et al. | ............. 318/100 |
| 7,888,900 | B2   | 2/2011  | Okamoto et al. | |
| 2004/0140787 | A1 * | 7/2004 | Okamoto et al. | ........ 318/568.21 |
| 2005/0228540 | A1 * | 10/2005 | Moridaira | ..................... 700/245 |

(Continued)

FOREIGN PATENT DOCUMENTS

| | | |
|---|---|---|
| CN | 101357093 | 2/2009 |
| CN | 101648377 | 2/2010 |

(Continued)

OTHER PUBLICATIONS

Chinese Office Action for corresponding CN Application No. 201280044332.9, Feb. 28, 2015.

(Continued)

*Primary Examiner* — Calvin Cheung
*Assistant Examiner* — Thomas Ingram
(74) *Attorney, Agent, or Firm* — Mori & Ward, LLP

(57) ABSTRACT

A mobile robot includes a truck capable of traveling by servo control, a robot arm mounted on the truck, and a control portion servo-controlling the traveling of the truck. The control portion is configured to set a servo gain of the servo control for the truck to a robot arm operation gain during the operation of the robot arm.

20 Claims, 12 Drawing Sheets

(56) References Cited

U.S. PATENT DOCUMENTS

| | | | |
|---|---|---|---|
| 2006/0097683 A1* | 5/2006 | Hosoda et al. | 318/568.12 |
| 2008/0231221 A1* | 9/2008 | Ogawa | 318/568.12 |
| 2011/0029133 A1 | 2/2011 | Okazaki et al. | |
| 2014/0316564 A1* | 10/2014 | Nakamura et al. | 700/245 |

FOREIGN PATENT DOCUMENTS

| | | |
|---|---|---|
| EP | 0333676 | 9/1989 |
| JP | 04-331083 | 11/1992 |
| JP | 04-331084 | 11/1992 |
| JP | 06-079656 | 3/1994 |
| JP | 06-095733 | 4/1994 |
| JP | 2000-071183 | 3/2000 |
| JP | 2001-088080 | 4/2001 |
| JP | 2004-167674 | 6/2004 |
| JP | 4385998 B2 | 12/2006 |
| JP | 2009-070357 | 4/2009 |
| JP | 2010-195160 | 9/2010 |
| JP | 2010-211511 | 9/2010 |
| JP | 2010-247267 | 11/2010 |
| JP | 2012-166315 | 9/2012 |

OTHER PUBLICATIONS

International Search Report for corresponding International Application No. PCT/JP2012/072898, Nov. 27, 2012.

Written Opinion for corresponding International Application No. PCT/JP2012/072898, Nov. 27, 2012.

Dunnigan et al., "Hybrid position/force control of a hydraulic underwater manipulator", IEE Proceedings D. Control Theory and Applications, Institution of Electrical Engineers. Stevenage, GB, vol. 143, No. 2, Mar. 25, 1996, pp. 145-151, XP006006308, see cite No. 5.

Extended European Search Report for corresponding EP Application No. 12832640.2-1807, Jun. 15, 2015.

* cited by examiner (FIRST EMBODIMENT)

FIG.9 PROCESSING UPON RECEIVING OPERATION COMMAND (FIRST EMBODIMENT)

(SECOND EMBODIMENT)

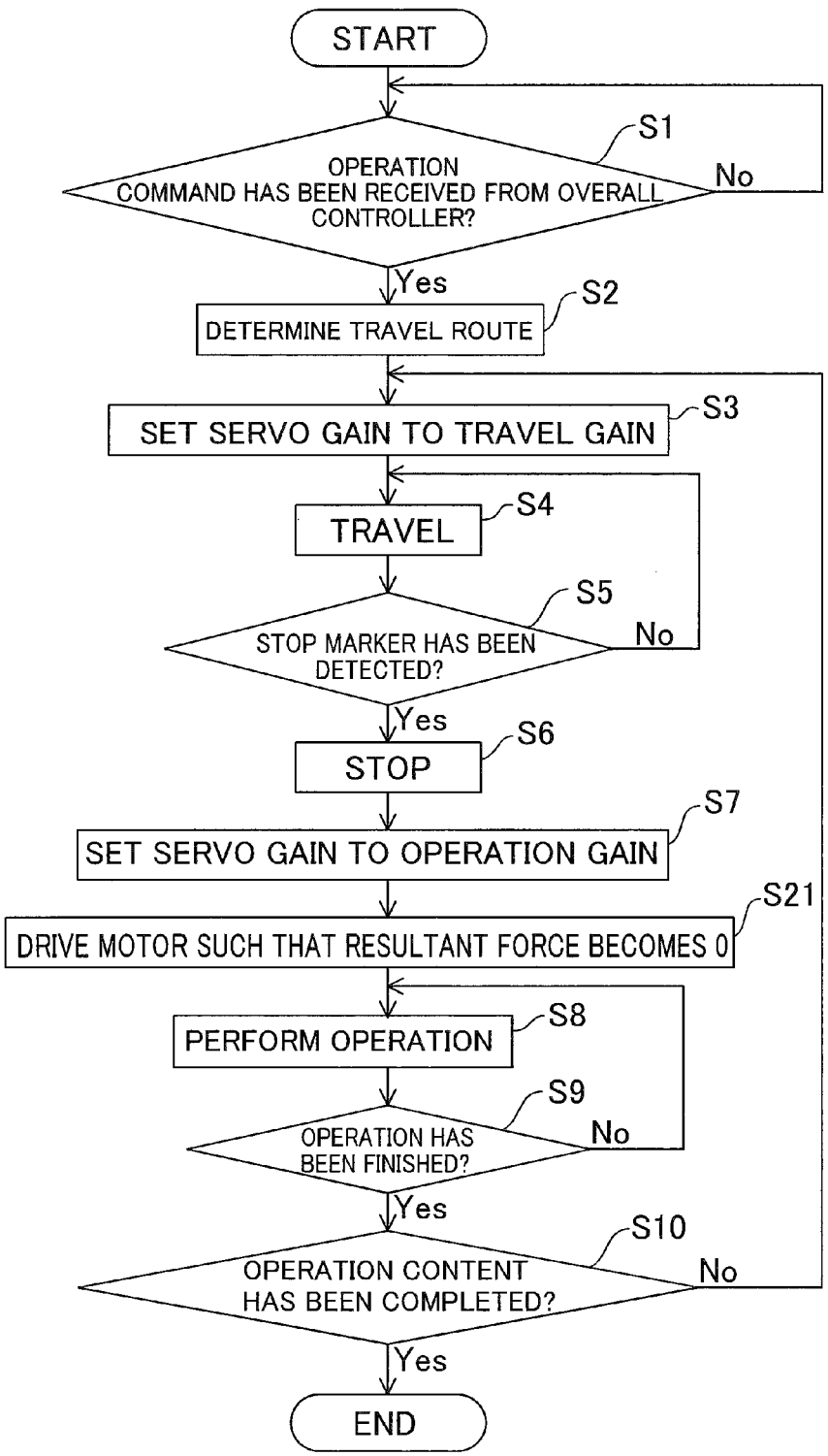
FIG.15 PROCESSING UPON RECEIVING OPERATION COMMAND (SECOND EMBODIMENT)

FIG. 16  STATE WHERE RESULTANT FORCE IS 0
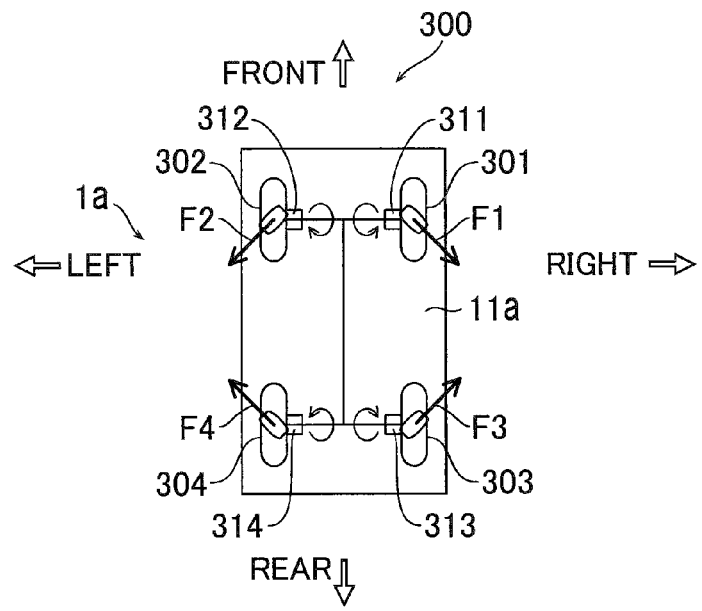
FIG. 17
(MODIFICATION OF SECOND EMBODIMENT)
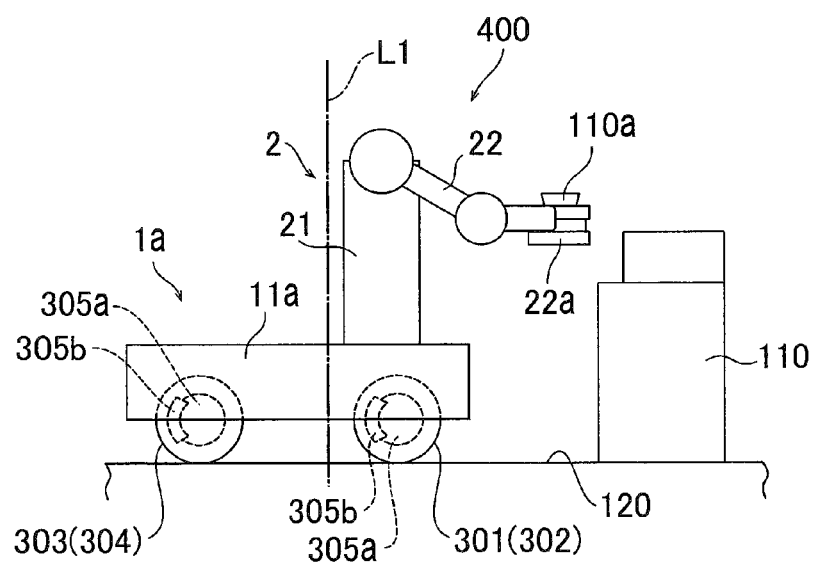

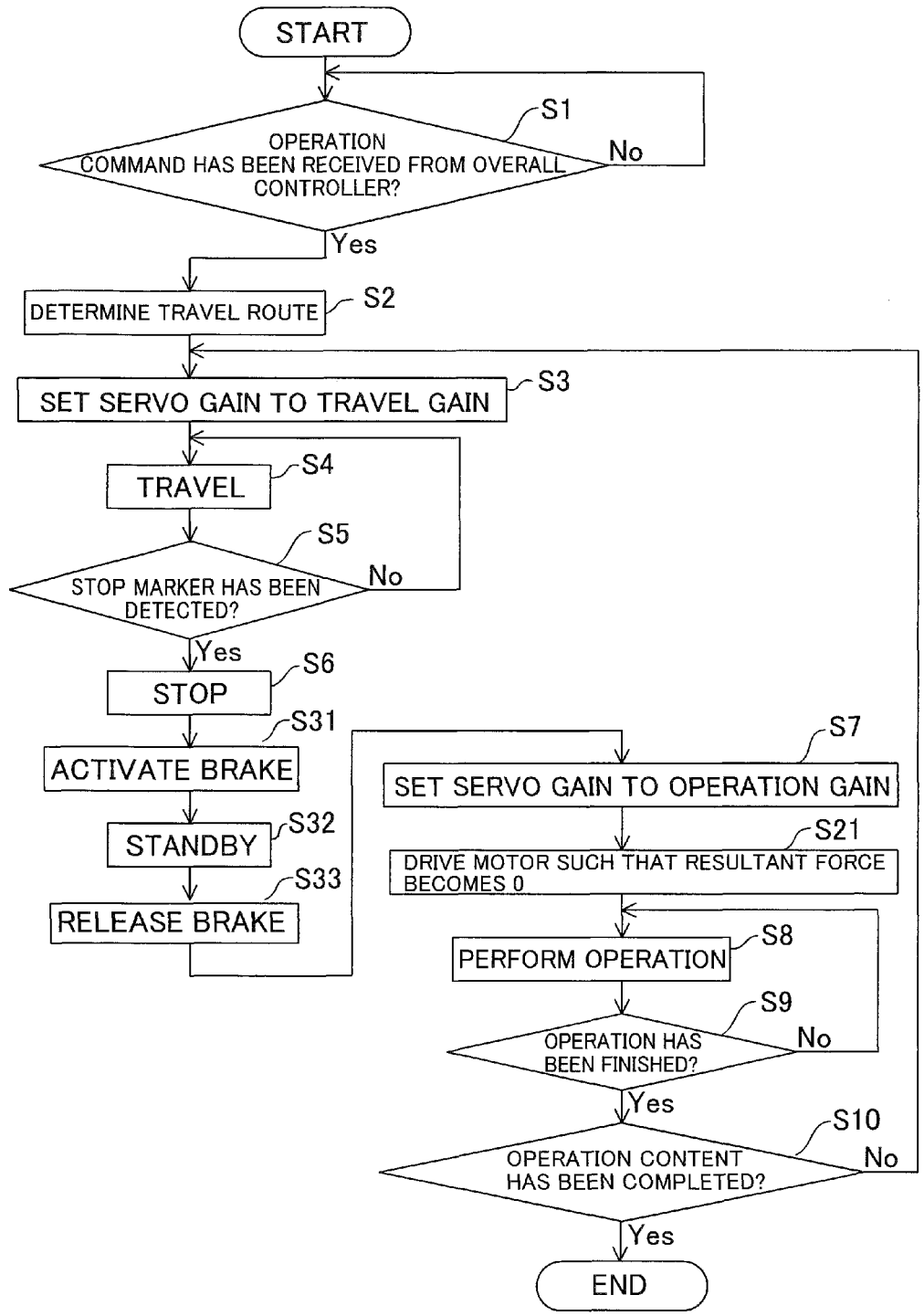
FIG.18 PROCESSING UPON RECEIVING OPERATION COMMAND (MODIFICATION OF SECOND EMBODIMENT)

MOBILE ROBOT AND MOBILE TRUCK

CROSS-REFERENCE TO RELATED APPLICATIONS

The priority application number JP2011-199872, Mobile Robot and Mobile Truck, Sep. 13, 2011, Dai Kouno and Tetsuro Izumi, upon which this patent application is based is hereby incorporated by reference. This application is a continuation of PCT/JP2012/072898, Mobile Robot and Mobile Truck, Sep. 7, 2012, Dai Kouno, Tetsuro Izumi, Tamio Nakamura, and Takashi Nishimura.

BACKGROUND OF THE INVENTION

1. Field of the Invention

The present invention relates to a mobile robot and a mobile truck.

2. Description of the Background Art

In Japanese Patent Laying-Open No. 2000-071183, a vacuum mechanism is provided in a conveying truck (mobile truck) and suctions a floor surface during the operation of the robot arm, whereby the swing of the conveying truck resulting from the reaction force generated by the turning operation of the robot arm or the like can be suppressed.

SUMMARY OF THE INVENTION

A mobile robot according to a first aspect includes a truck capable of traveling by servo control, a robot arm mounted on the truck, and a control portion servo-controlling the traveling of the truck, while the control portion is configured to set a servo gain of the servo control for the truck to a traveling gain during the traveling of the truck and set the servo gain of the servo control for the truck to a robot arm operation gain during the operation of the robot arm.

In the mobile robot according to the first aspect, as hereinabove described, the control portion is configured to set the servo gain of the servo control for the truck to the robot arm operation gain during the operation of the robot arm, whereby the swing of the truck resulting from reaction force generated by the operation of the robot arm can be suppressed by setting the servo gain of the servo control for the truck to a servo gain suitable for the operation of the robot arm depending on the state during the operation of the robot arm. Thus, a dedicated mechanism such as a vacuum mechanism does not need to be provided separately in the truck in order to suppress the swing of the truck, and hence complication of the structure of the truck can be suppressed. Furthermore, the swing of the truck can be suppressed during the operation of the robot arm, and hence an operator does not need to wait for the truck to return to an original position by servo control after the truck is once swung, or the waiting time can be reduced. Consequently, the loss of operation time can be reduced. In addition, the control portion sets the servo gain of the servo control for the truck to the traveling gain during the traveling of the truck, whereby the behavior of the truck during the traveling can be further stabilized by setting the servo gain during the traveling to a servo gain suitable for the traveling of the truck.

A mobile truck according to a second aspect includes a truck mounted with a robot arm and capable of traveling by servo control and a control portion servo-controlling the traveling of the truck, while the control portion is configured to set a servo gain of the servo control for the truck to a traveling gain during the traveling of the truck and set the servo gain of the servo control for the truck to a robot arm operation gain during the operation of the robot arm.

In the mobile truck according to the second aspect, as hereinabove described, the control portion is configured to set the servo gain of the servo control for the truck to the robot arm operation gain during the operation of the robot arm, whereby the swing of the truck resulting from reaction force generated by the operation of the robot arm can be suppressed by setting the servo gain of the servo control for the truck to a servo gain suitable for the operation of the robot arm depending on the state during the operation of the robot arm. Thus, a dedicated mechanism such as a vacuum mechanism does not need to be provided separately in the truck in order to suppress the swing of the truck, and hence complication of the structure of the truck can be suppressed. Furthermore, the swing of the truck can be suppressed during the operation of the robot arm, and hence an operator does not need to wait for the truck to return to an original position by servo control after the truck is once swung, or the waiting time can be reduced. Consequently, the loss of operation time can be reduced. In addition, the control portion sets the servo gain of the servo control for the truck to the traveling gain during the traveling of the truck, whereby the behavior of the truck during the traveling can be further stabilized by setting the servo gain during the traveling to a servo gain suitable for the traveling of the truck.

According to the aforementioned mobile robot and mobile truck, the swing of the truck resulting from the reaction force generated by the operation of the robot arm can be suppressed during the operation of the robot arm while complication of the structure of the truck is suppressed.

BRIEF DESCRIPTION OF THE DRAWINGS

FIG. 15 is a flowchart for illustrating processing performed by a control portion of the mobile robot according to the second embodiment when the control portion receives an operation command;

FIG. 16 is a plan view for illustrating force generated by the driving of the wheel of the mobile robot according to the second embodiment;

FIG. 17 is a side elevational view showing the overall structure of a mobile robot according to a modification of the second embodiment; and FIG. 18 is a flowchart for illustrating processing performed by a control portion of the mobile robot according to the modification of the second embodiment when the control portion receives an operation command.

DESCRIPTION OF THE EMBODIMENTS

Embodiments are hereinafter described on the basis of the drawings.

First Embodiment

The structure of a mobile robot 100 according to a first embodiment is described with reference to FIGS. 1 to 8.

Figure 1:
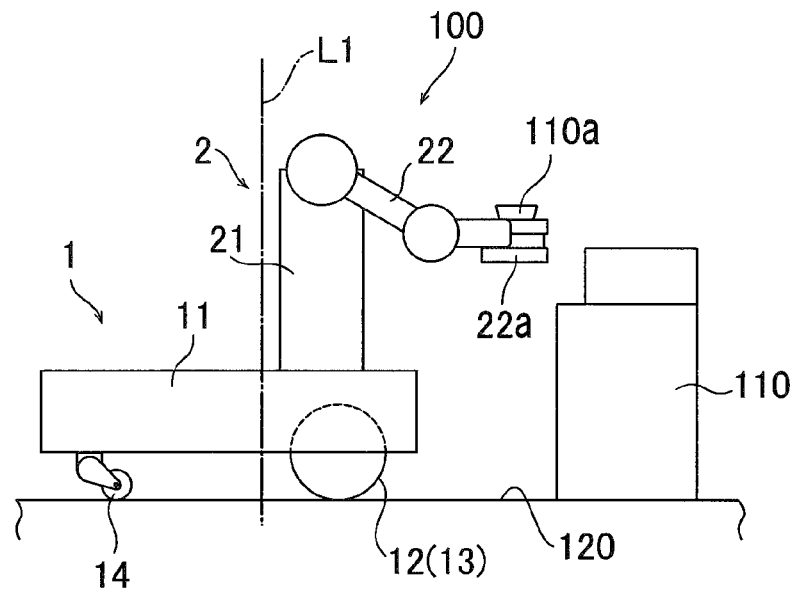
FIG. 1 is a side elevational view showing the overall structure of a mobile robot according to a first embodiment.
Figure 2:
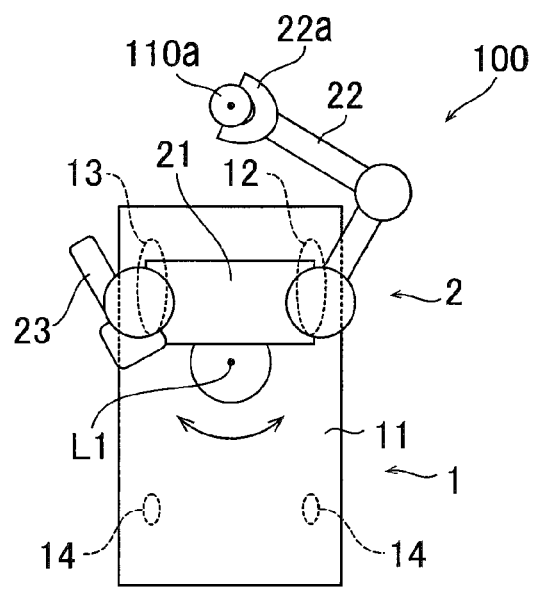
FIG. 2 is a plan view showing the overall structure of the mobile robot according to the first embodiment.
Figure 3:
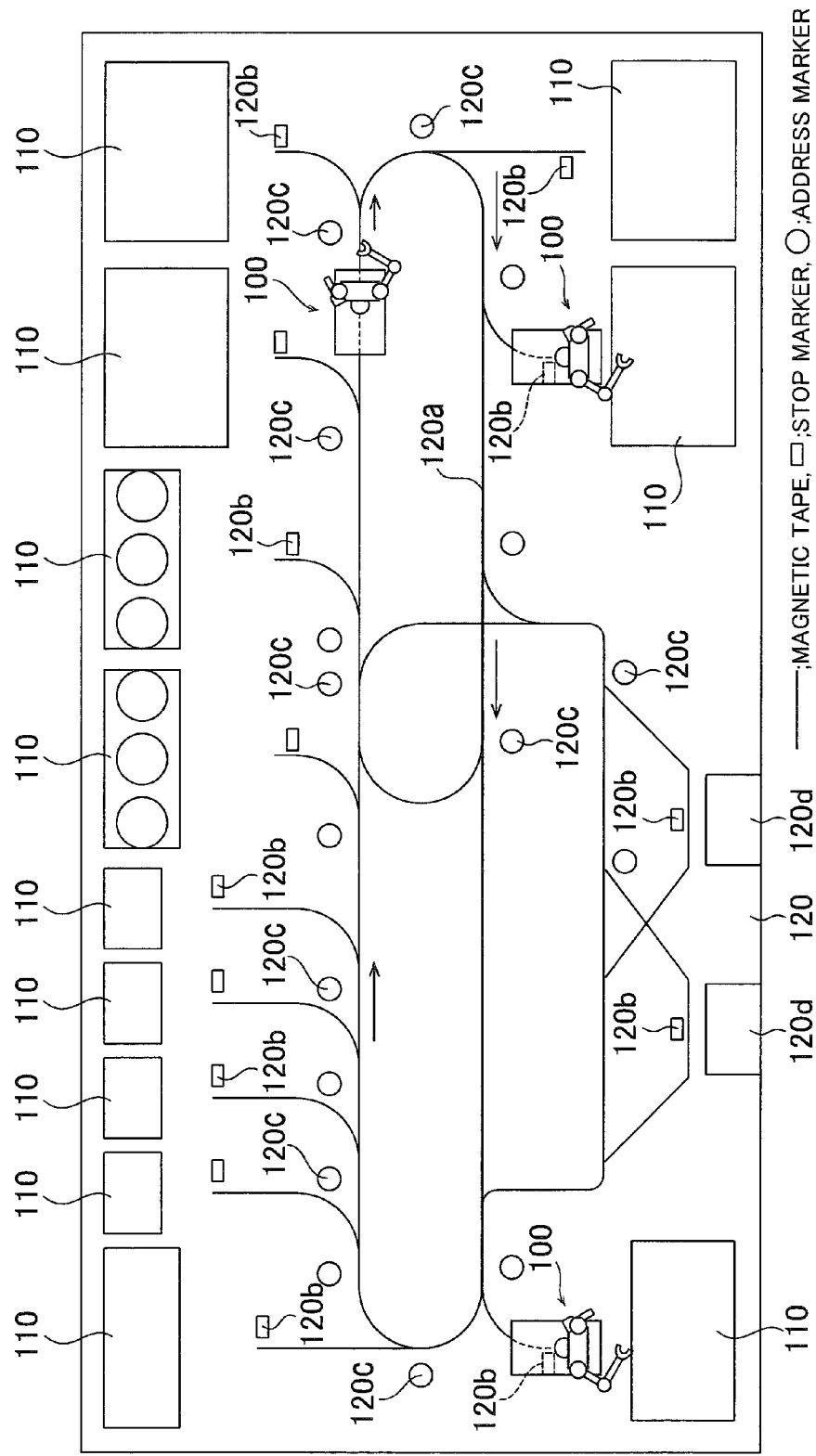
FIG. 3 is a plan view schematically showing a work area of the mobile robot according to the first embodiment.

The mobile robot 100 according to the first embodiment includes a truck 1 capable of traveling by servo control and a robot body 2 mounted on the truck 1, as shown in FIGS. 1 and 2. The mobile robot 100 is configured to move to a work position corresponding to a prescribed processing apparatus 110 by the truck 1 and perform a prescribed operation according to the corresponding processing apparatus 110 at the work position, which is a destination, by the robot body 2, as shown in FIG. 3. The truck 1 is an example of the "truck" or the "mobile truck".

The truck 1 includes a truck body 11, a right drive wheel 12 and a left drive wheel 13 provided on an anterior portion of the truck body 11, and two driven wheels (casters) provided on a posterior portion of the truck body 11, as shown in FIGS. 1 and 2. The right drive wheel 12 and the left drive wheel 13 are configured to be driven by a right wheel servomotor 121 and a left wheel servomotor 131 (see FIG. 4), respectively. The truck 1 is a differential two-wheel drive truck in which a traveling direction is varied depending on a difference between the rotation (rotation amount) of the right drive wheel 12 and the rotation (rotation amount) of the left drive wheel 13. The right drive wheel 12 and the left drive wheel 13 are examples of the "wheel". The right wheel servomotor 121 and the left wheel servomotor 131 are examples of the "servomotor".

Figure 4:
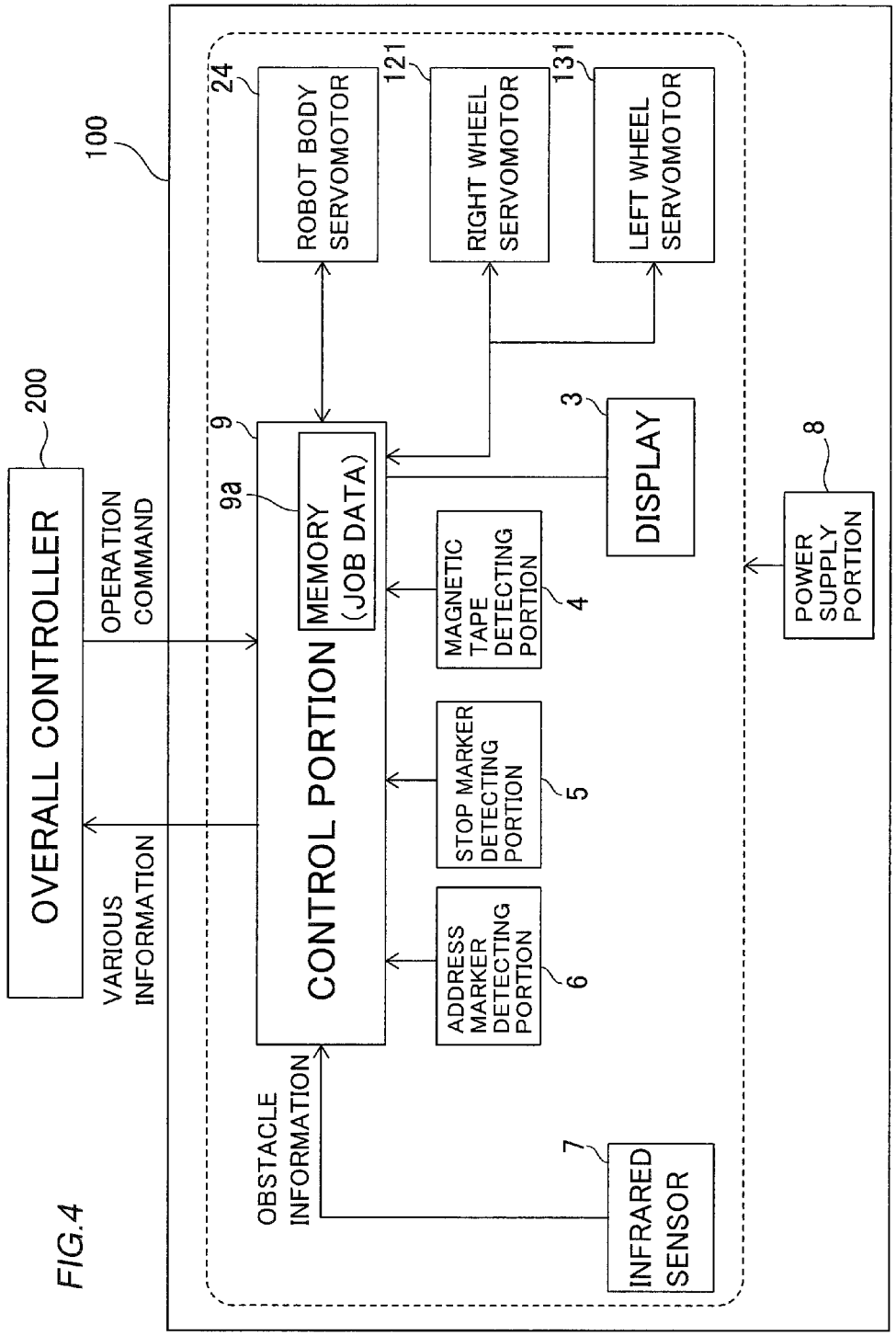
FIG. 4 is a block diagram showing the structure of the mobile robot according to the first embodiment.

The robot body 2 is configured to perform a different operation according to each of a plurality of processing apparatuses 110 at a plurality of work positions corresponding to the plurality of processing apparatuses 110. The robot body 2 is mounted on the truck body 11, as shown in FIGS. 1 and 2. The robot body 2 is a dual-arm robot including a body portion 21 and a right arm 22 and a left arm 23 mounted on the body portion 21. The body portion 21 is configured to be rotatable (turnable) with respect to the truck 1 about an axis line L1 extending in a vertical direction. The right arm 22 has an articulated structure having a plurality of joints. The right arm 22 is an example of the "robot arm" or the "arm portion". The right arm 22 is configured to be capable of grasping an object 110a with a hand portion 22a provided on the tip. The body portion 21, the right arm 22, and the left arm 23 are configured to be driven by a robot body servomotor 24 (see FIG. 4). FIG. 4 shows only one robot body servomotor 24, but a plurality of servomotors are actually provided for the rotation operation of the body portion 21, the expansion and contraction of each of the right arm 22 and the left arm 23, etc. Due to this structure, the robot body 2 can move the object 110a grasped by the hand portion 22a to an arbitrary position by combining the rotation (turning) operation of the body portion 21, the rotation (turning) operation and the expansion and contraction operation of the right arm 22, etc.

The mobile robot 100 is provided with a display 3, a magnetic tape detecting portion 4, a stop marker detecting portion 5, an address marker detecting portion 6, an infrared sensor 7, a power supply portion 8, and a control portion 9, as shown in FIG. 4. The display 3 is configured to be capable of displaying the state information, error information, etc. of the mobile robot 100. The magnetic tape detecting portion 4 is provided to detect a magnetic tape 120a previously applied onto a floor surface 120 of a work area along the travel route of the mobile robot 100. The mobile robot 100 is configured to travel along a prescribed travel route while detecting the magnetic tape 120a with the magnetic tape detecting portion 4. The stop marker detecting portion 5 is provided to detect a stop marker 120b provided in correspondence to the work position for each of the processing apparatuses 110. The mobile robot 100 is configured to stop at a prescribed work position on the basis of a detection result obtained by the stop marker detecting portion 5. The stop marker detecting portion 5 is an example of the "stop position detecting portion". The address marker detecting portion 6 is provided to detect an address marker 120c provided in correspondence to a branch point of the travel route. The address marker 120c has unique identification information (address information) presented by a bar code or the like. Therefore, the mobile robot 100 can travel while confirming where the same is traveling on the travel route on the basis of a detection result obtained by the address marker detecting portion 6.

The infrared sensor 7 is provided to detect an obstacle on the travel route. The mobile robot 100 is configured to avoid a collision with the obstacle on the basis of a detection result obtained by the infrared sensor 7. The power supply portion 8 includes a rechargeable battery and has a function of supplying power to each part of the mobile robot 100. The mobile robot 100 can move to a position corresponding to a charging apparatus 120d provided in the work area and charge the power supply portion 8 from the charging apparatus 120d.

The control portion 9 is configured to be capable of controlling the entire operation of the mobile robot 100. The control portion 9 is configured to servo-control the traveling of the truck 1 and the operation of the robot body 2. The control portion 9 is configured to be capable of communicating over a radio with an overall controller 200 provided separately from the mobile robot 100 and is configured to control the operation of the mobile robot 100 on the basis of an operation command transmitted from the overall controller 200. Specifically, the control portion 9 is provided with a memory 9a storing job data stored in such a manner that the stop marker 120b, the address marker 120c, a branching direction, the information of the processing apparatuses 110, etc. are associated with each other. The control portion 9 is configured to determine the travel route according to the operation command on the basis of the operation command from the overall controller 200 and the job data. The control portion 9 servo-controls the traveling of the truck 1 such that the truck 1 moves to the prescribed work position along the determined travel route. The control portion 9 is configured to servo-control the robot body 2 to perform a prescribed operation corresponding to the operation command at the prescribed work position. Furthermore, the control portion 9 is configured to sequentially transmit information such as the detection result obtained by the infrared sensor 7 and the operating state of the mobile robot 100 to the overall controller 200.

According to the first embodiment, the control portion 9 is configured to be capable of performing control of changing servo gains of servo control for the right wheel servomotor 121 and the left wheel servomotor 131 of the truck 1. The servo gains are control parameters. The responsiveness of the servo control is improved as the servo gains are increased, and the responsiveness of the servo control is reduced as the servo gains are decreased. Specifically, the control portion 9 is configured to set the servo gains for the right and left servomotors 121 and 131 to travel gains during the traveling of the truck 1 and set the servo gains for the right and left servomotors 121 and 131 to operation gains larger than the travel gains (ten times the travel gains, for example) during the operation of the robot body 2. In other words, the control portion 9 is configured to render the servo gains for the right and left servomotors 121 and 131 larger than those during the traveling of the truck 1, during the operation of the robot body 2. Furthermore, the control portion 9 is configured to switch the servo gains for the right and left servomotors 121 and 131 from the travel gains to the operation gains when the truck 1 stops at the prescribed work position. The travel gains are examples of the "traveling gain", and the operation gains are examples of the "robot arm operation gain".

Figure 5:
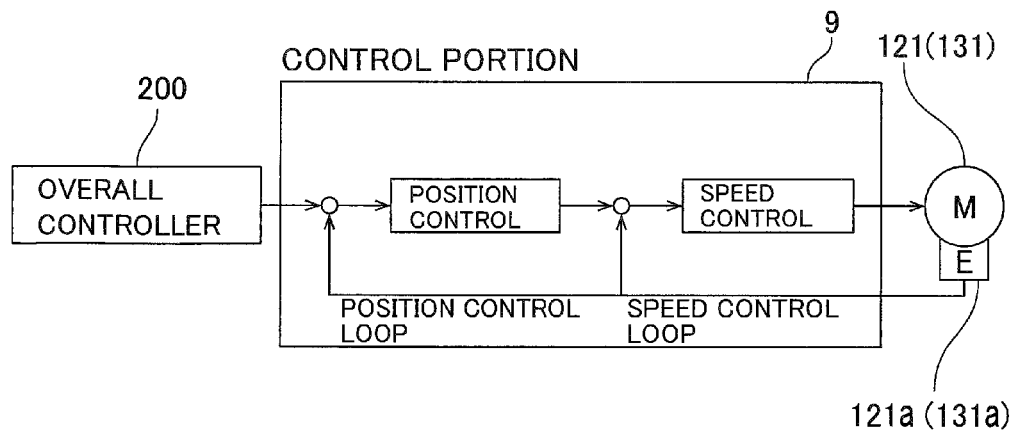
FIG. 5 is a diagram for illustrating servo control for a truck of the mobile robot according to the first embodiment.
Figure 6:
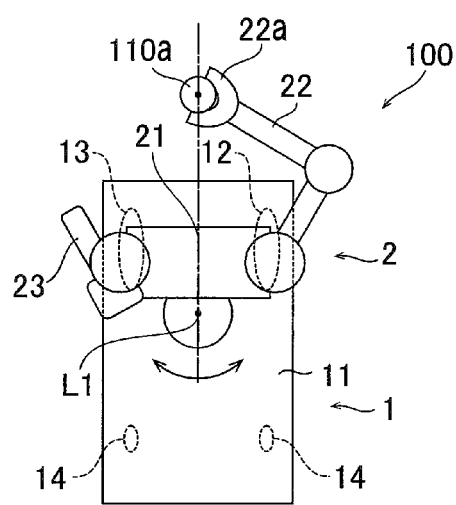
FIG. 6 is a plan view showing the basic posture of the mobile robot according to the first embodiment.

The control portion 9 is configured to servo-control the right wheel servomotor 121 (left wheel servomotor 131) through position control and speed control on the basis of the operation command from the overall controller 200, as shown in FIG. 5. Specifically, the control portion 9 is configured to acquire information from an encoder 121a (131a) provided in the right wheel servomotor 121 (left wheel servomotor 131) and perform feedback control. Furthermore, the control portion 9 is configured to render both a servo gain of position control and a servo gain of speed control for the right wheel servomotor 121 (left wheel servomotor 131) larger than those during the traveling of the truck 1, during the operation of the robot body 2. In other words, the control portion 9 is configured to switch the servo gains in both a position control loop and a speed control loop for the right wheel servomotor 121 (left wheel servomotor 131) from the travel gains to the operation gains during the operation of the robot body 2.

Figure 7:
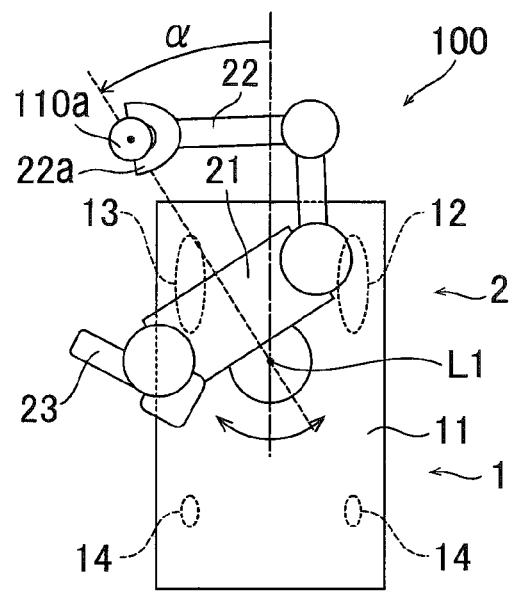
FIG. 7 is a plan view showing a state where a robot body of the mobile robot according to the first embodiment is turned by a prescribed amount.
Figure 8:
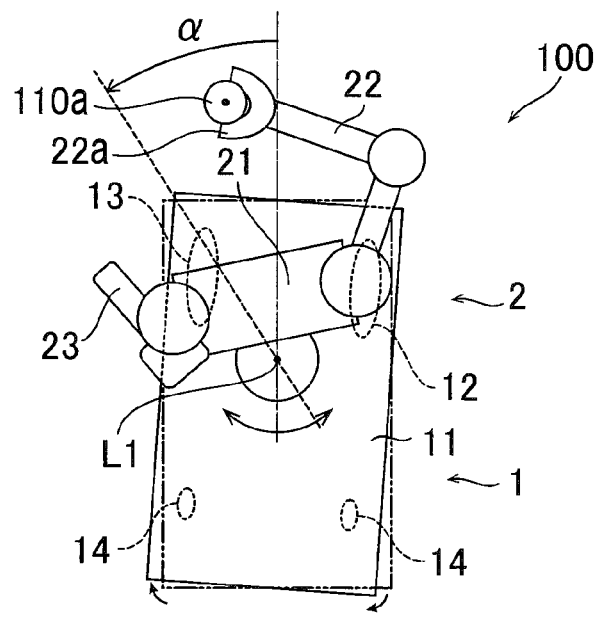
FIG. 8 is a plan view showing a state where the truck is swung due to reaction force generated by the turning of the robot body of the mobile robot according to the first embodiment.

According to the first embodiment, the control portion 9 is configured to uniformly set the servo gains to the same operation gains during an operation on any of the processing apparatuses 110. The operation gains are set to values larger than the travel gains within a range in which the truck 1 does not slip on the floor surface 120 due to the operation of the robot body 2 during the operation of the robot body 2 at the work position where reaction force is maximum. Furthermore, the operation gains are set to values with which the swing (see FIG. 8) of the truck 1 resulting from reaction force generated by the turning of the right arm 22 is substantially restored to zero by the time the turning amount of the right arm 22 with respect to the truck 1 reaches a prescribed amount ($\alpha$ degrees, for example) when the right arm 22 of the robot body 2 is turned by the prescribed amount ($\alpha$ degrees, for example) with respect to the truck 1 as shown in FIG. 7 from the state of a basic posture shown in FIG. 6 during the operation of the robot body 2 at the work position where the reaction force is maximum and the values larger than the travel gains.

Figure 9:
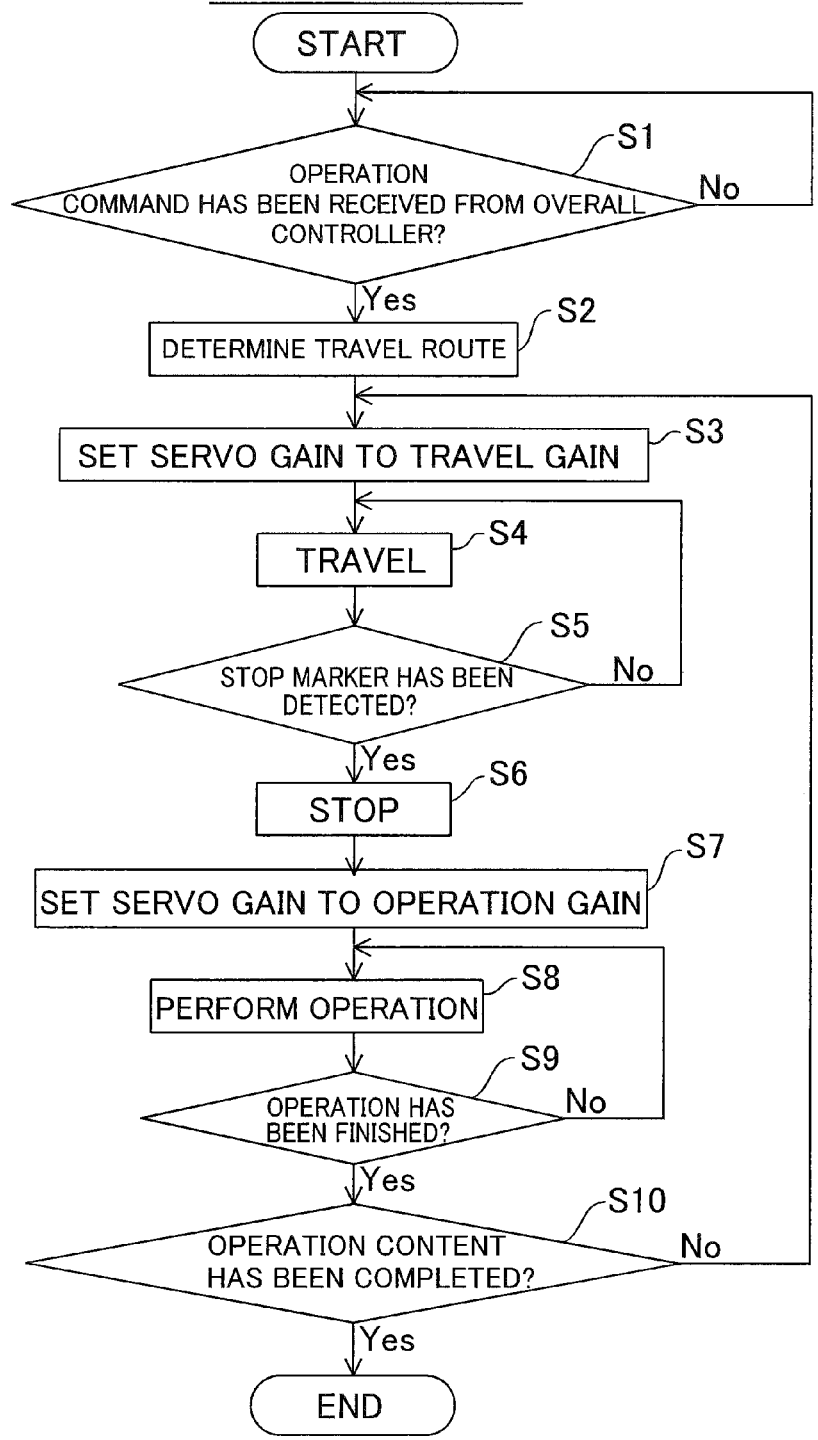
FIG. 9 is a flowchart for illustrating processing performed by a control portion of the mobile robot according to the first embodiment when the control portion receives an operation command.

Processing performed by the control portion 9 of the mobile robot 100 according to the first embodiment when the control portion 9 receives the operation command is now described with reference to FIG. 9.

First, the control portion 9 determines whether or not the operation command has been received from the overall controller 200 at a step S1. The control portion 9 repeats this determination until the operation command is received and determines the travel route according to the operation command on the basis of the received operation command and the job data at a step S2 when receiving the operation command. Then, the control portion 9 sets the servo gains of the servo control for the right wheel servomotor 121 and the left wheel servomotor 131 of the truck 1 to the travel gains at a step S3. Thereafter, at a step S4, the control portion 9 controls the traveling of the truck 1 such that the truck 1 moves to the prescribed work position along the travel route determined at the step S2. The control portion 9 determines whether or not the stop maker detecting portion 5 has detected the stop marker 120b at the work position corresponding to the operation command at a step S5 and continues traveling control for the truck 1 until the stop maker detecting portion 5 detects the stop marker 120b. Then, the control portion 9 determines that the truck 1 has reached the prescribed work position when the stop marker detecting portion 5 detects the stop marker 120b and stops the truck 1 by stopping the driving of the right and left servomotors 121 and 131 at a step S6.

At a step S7, the control portion 9 sets (switches) the servo gains of the servo control for the right wheel servomotor 121 and the left wheel servomotor 131 to the operation gains when the truck 1 stops at the work position. Thereafter, the control portion 9 allows the robot body 2 to perform a prescribed operation corresponding to the operation command by controlling the robot body servomotor 24 while stopping the truck 1 at the work position at a step S8. The control portion 9 determines whether or not the operation has been finished at a step S9 and repeats this determination until the operation is finished.

When the operation is finished, the control portion 9 determines whether or not all the contents of the operation command received from the overall controller 200 have been executed (completed) at a step S10. When the command contents have not been completed, the control portion 9 returns to the step S3 and sets the servo gains for the right wheel servomotor 121 and the left wheel servomotor 131 to the travel gains. In other words, the control portion 9 performs control of restoring the servo gains for the right wheel servomotor 121 and the left wheel servomotor 131 to the travel gains after the operation of the robot body 2 is finished. Thereafter, the control portion 9 performs control of traveling the truck 1 to a next work position corresponding to an operation command at the step S4.

According to the first embodiment, as hereinabove described, the control portion 9 is configured to set the servo gains of servo control for the truck 1 to the operation gains during the operation of the right arm 22, whereby the swing of the truck 1 resulting from reaction force generated by the operation of the right arm 22 can be suppressed by setting the servo gains of the servo control for the truck 1 to the servo gains suitable for the operation of the right arm 22 during the operation of the right arm 22. Thus, a dedicated mechanism such as a vacuum mechanism does not need to be provided separately in the truck 1 in order to suppress the swing of the truck 1, and hence complication of the structure of the truck 1 can be suppressed. Furthermore, the swing of the truck 1 can be suppressed during the operation of the right arm 22, and hence an operator does not need to wait for the truck 1 to return to an original position by servo control after the truck 1 is once swung, or the waiting time can be reduced. Consequently, the loss of operation time can be reduced. In addition, the control portion 9 sets the servo gains of the servo control for the truck 1 to the travel gains during the traveling of the truck 1, whereby the behavior of the truck 1 during the traveling can be stabilized by setting the servo gains during the traveling to the servo gains suitable for the traveling of the truck 1.

According to the first embodiment, as hereinabove described, the control portion 9 sets the operation gains within the range in which the truck 1 does not slip on the floor surface 120 due to the operation of the right arm 22 during the operation of the right arm 22, whereby deviation of the reference position of the truck 1 for feedback control resulting from the reaction force generated by the operation of the right arm 22 during the operation of the robot body 2 can be suppressed.

According to the first embodiment, as hereinabove described, the control portion 9 sets the servo gains of the servo control for the truck 1 to the servo gains with which the swing of the truck 1 is substantially restored to zero by the time the turning amount of the right arm 22 reaches the prescribed amount (α degrees, for example) when the right arm 22 of the robot body 2 is turned by the prescribed amount (α degrees, for example) with respect to the truck 1 to swing the truck 1 by the reaction force generated by the turning of the right arm 22 during the operation of the robot body 2 and the servo gains larger than those during the traveling of the truck 1. Thus, the loss of operation time can be suppressed even in the case where the truck 1 is swung by reaction force generated by the turning of the right arm 22 when the right arm 22 of the robot body 2 is turned with respect to the truck 1 by a prescribed amount (α degrees, for example) to perform an operation.

According to the first embodiment, as hereinabove described, the control portion 9 is configured to render the servo gains of the servo control for the truck 1 larger than those during the traveling of the truck 1, during the operation of the robot body, whereby the responsiveness of the servo control for the truck 1 is improved to increase servo lock force during the operation of the robot body 2, and hence the swing of the truck 1 resulting from reaction force generated by the operation of the robot body 2 can be suppressed. Furthermore, during the operation of the robot body 2, the control portion 9 renders the servo gains of the servo control for the truck 1 larger than those during the traveling of the truck 1, whereby the servo gains can be reduced during the traveling while the servo gains are rendered large during the operation of the robot body 2. Thus, the responsiveness of the servo control for the truck 1 can be improved only during the operation not during the traveling, and hence the swing of the truck 1 resulting from the reaction force generated by the operation of the robot body 2 can be suppressed during the operation of the robot body 2 while instability resulting from the sensitive behavior of the truck 1 during the traveling is suppressed.

According to the first embodiment, as hereinabove described, the control portion 9 switches the servo gains of the servo control for the truck 1 from the travel gains to the operation gains larger than the travel gains when the truck 1 stops at the work position. Thus, the swing of the truck 1 resulting from the reaction force generated by the operation of the robot body 2 can be reliably suppressed by rendering the servo gains of the servo control for the truck 1 larger than those during the traveling when the truck 1 stops at the work position.

According to the first embodiment, as hereinabove described, the control portion 9 determines that the truck 1 has reached the work position on the basis of the detection result obtained by the stop marker detecting portion 5. Thus, the control portion 9 can easily determine that the truck 1 has reached the work position.

According to the first embodiment, as hereinabove described, the control portion 9 renders the servo gains of the servo control for the truck 1 larger than those during the traveling of the truck 1, during the operation of the right arm 22 and restores the servo gains of the servo control for the truck 1 to those during the traveling of the truck 1 after the operation of the right arm 22 is finished. Thus, the instability resulting from the sensitive traveling behavior can be suppressed due to the restoration to the travel gains after the operation is finished even in the case where the robot body 2 moves to another work position and performs another operation after finishing the operation at the prescribed work position, and hence the truck 1 can be stably traveled to a next work position.

According to the first embodiment, as hereinabove described, the control portion 9 renders both the servo gains of position control and the servo gains of speed control larger than those during the traveling of the truck 1, during the operation of the robot body 2. Thus, the swing of the truck 1 can be reliably suppressed by rendering both the servo gains of position control and the servo gains of speed control large during the operation of the robot body 2.

Second Embodiment

The structure of a mobile robot 300 according to a second embodiment is now described with reference to FIGS. 10 to 16. In the second embodiment, the mobile robot 300 includes four drive wheels is described, unlike the mobile robot 100 including the two drive wheels in the aforementioned first embodiment. In the second embodiment, the figures illustrate structures similar to those in the aforementioned first embodiment, employing the same signs, and the description is omitted.

The structure of the mobile robot 300 according to the second embodiment is described with reference to FIGS. 10 to 16.

Figure 10:
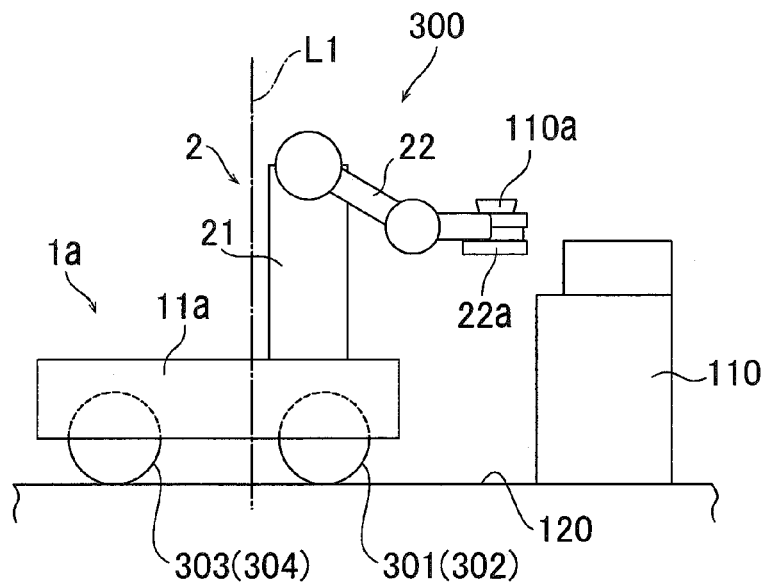
FIG. 10 is a side elevational view showing the overall structure of a mobile robot according to a second embodiment.
Figure 11:
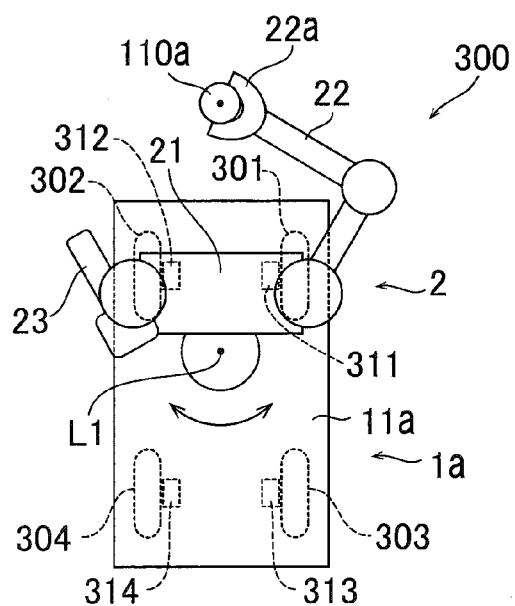
FIG. 11 is a plan view showing the overall structure of the mobile robot according to the second embodiment.

A truck 1a includes a truck body 11a, a right front drive wheel 301 and a left front drive wheel 302 provided on an anterior portion of the truck body 11a, and a right rear drive wheel 303 and a left rear drive wheel 304 provided on a posterior portion of the truck body 11a, as shown in FIGS. 10 and 11. The right front drive wheel 301 and the left front drive wheel 302 are configured to be driven by a right front wheel servomotor 311 and a left front wheel servomotor 312 (see FIG. 14), respectively. The right rear drive wheel 303 and the left rear drive wheel 304 are configured to be driven by a right rear wheel servomotor 313 and a left rear wheel servomotor 314 (see FIG. 14), respectively. The right front drive wheel 301, the left front drive wheel 302, the right rear drive wheel 303, and the left rear drive wheel 304 are configured to be capable of being driven by the right front wheel servomotor 311, the left front wheel servomotor 312, the right rear wheel servomotor 313, and the left rear wheel servomotor 314, respectively, such that the rotation directions and the rotational speeds thereof are independent of each other. The right front drive wheel 301, the left front drive wheel 302, the right rear drive wheel 303, and the left rear drive wheel 304 are examples of the "wheel". The right front wheel servomotor 311, the left front wheel servomotor 312, the right rear wheel servomotor 313, and the left rear wheel servomotor 314 are examples of the "servomotor".

Figure 12:
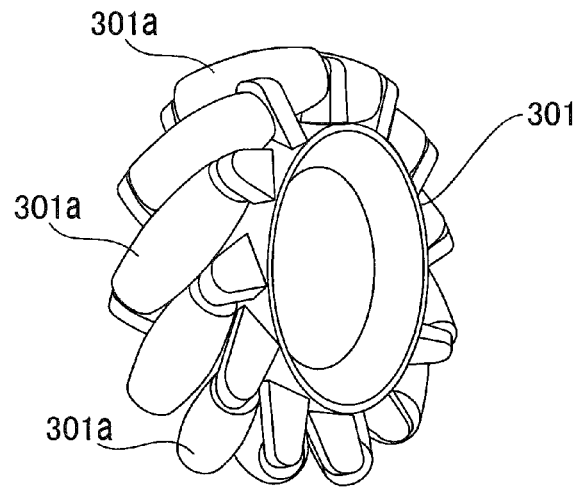
FIG. 12 is a perspective view showing a wheel of the mobile robot according to the second embodiment.
Figure 13:
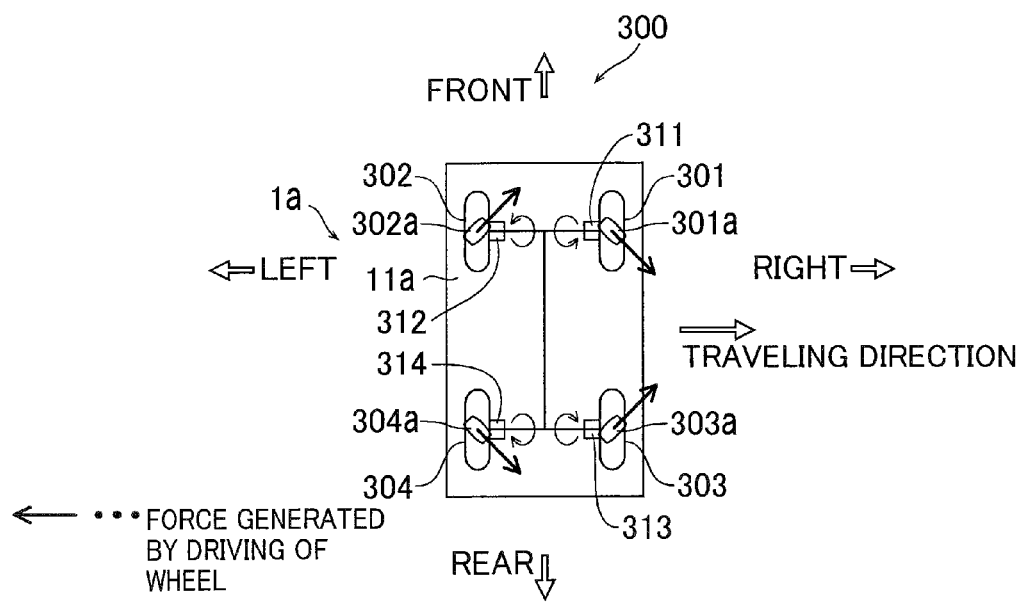
FIG. 13 is a plan view for illustrating the movement of the mobile robot according to the second embodiment.
Figure 14:
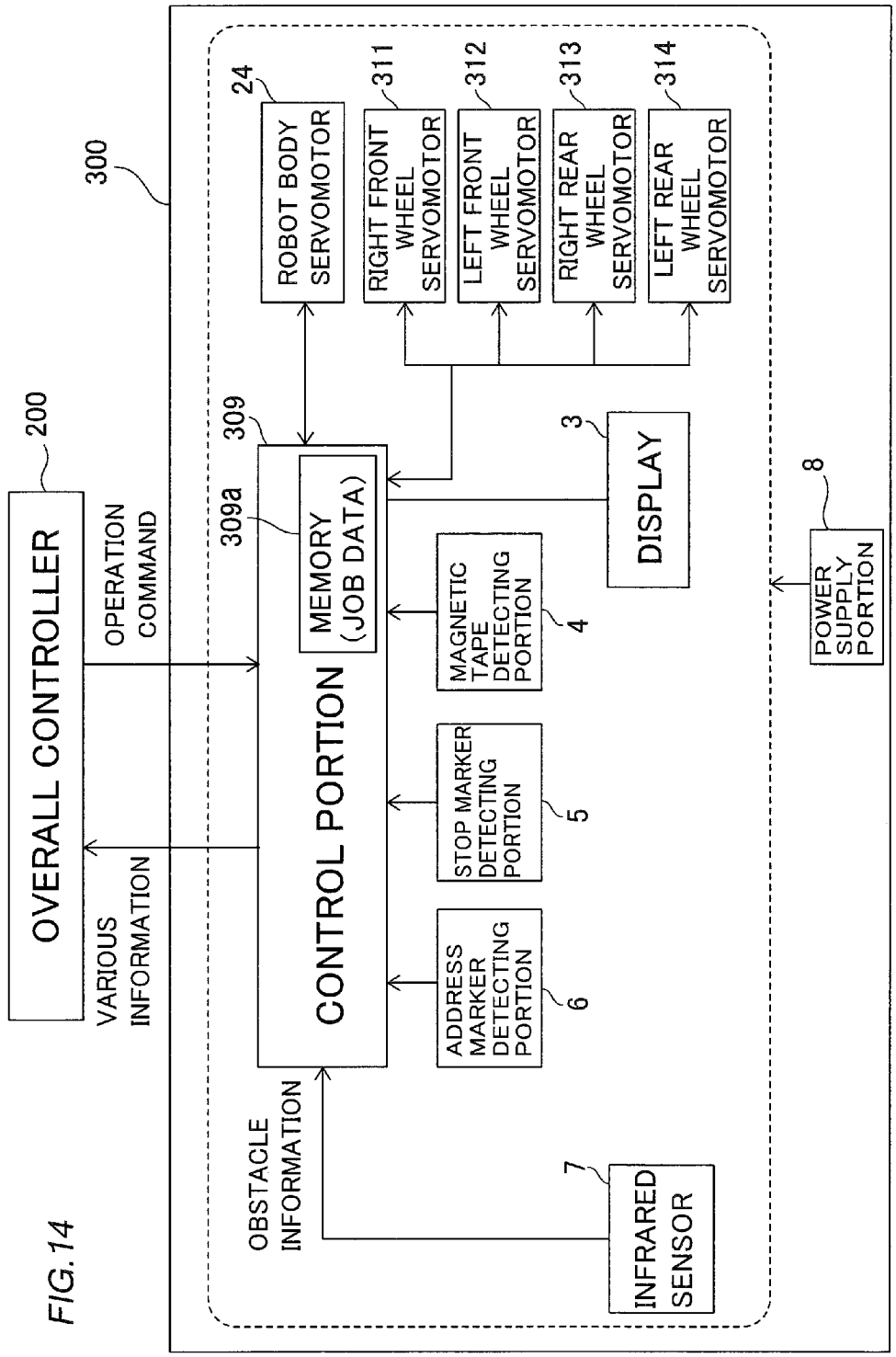
FIG. 14 is a block diagram showing the structure of the mobile robot according to the second embodiment.

The right front drive wheel 301, the left front drive wheel 302, the right rear drive wheel 303, and the left rear drive wheel 304 each include a Mecanum wheel. Specifically, the right front drive wheel 301 includes a plurality of rollers 301a each having a rotation axis inclined at 45 degrees with respect to the rotation axis of the wheel, as shown in FIG. 12. The rollers 301a are configured to be freely rotatable. The left front drive wheel 302, the right rear drive wheel 303, and the left rear drive wheel 304 also include rollers 302a, 303a, and 304a similar to the rollers 301a of the right front drive wheel 301, respectively. Thus, the truck 1a is configured to be movable in an anteroposterior direction, be movable in a direction intersecting with the anteroposterior direction, and be turnable. For example, all the wheels are rotated in an anterior direction, whereby the truck 1a is moved in the anterior direction, and all the wheels are rotated in a posterior direction, whereby the truck 1a is moved in the posterior direction. The right front drive wheel 301 and the left rear drive wheel 304 are rotated in the posterior direction, and the left front drive wheel 302 and the right rear drive wheel 303 are rotated in the anterior direction, whereby the truck 1a is moved in a right direction, as shown in FIG. 13. Furthermore, the right front drive wheel 301 and the left rear drive wheel 304 are not driven, and the left front drive wheel 302 and the right rear drive wheel 303 are rotated in the anterior direction, whereby the truck 1a is moved in a diagonally forward right direction. The right front drive wheel 301 and the right rear drive wheel 303 are rotated in the anterior direction, and the left front drive wheel 302 and the left rear drive wheel 304 are rotated in the posterior direction, whereby the truck 1a is turned in a counterclockwise direction. Combinations of the rotation directions of the wheels are varied, whereby the truck 1a is movable and turnable in other directions.

According to the second embodiment, a control portion 309 is configured to set servo gains of servo control for the truck 1a to travel gains during the traveling of the truck 1a and set the servo gains of the servo control for the truck 1a to operation gains during the operation of a right arm 22. The control portion 309 is configured to drive the right front wheel servomotor 311, the left front wheel servomotor 312, the right rear wheel servomotor 313, and the left rear wheel servomotor 314 such that force generated by the driving of the right front drive wheel 301, force generated by the driving of the left front drive wheel 302, force generated by the driving of the right rear drive wheel 303, and force generated by the driving of the left rear drive wheel 304 balance with each other during the operation of the right arm 22 and move the right arm 22 in a state where the servo gains of the servo control for a plurality of servomotors 311 to 314 of the truck 1a are set to the operation gains. Specifically, the control portion 309 is configured to drive the plurality of servomotors 311 to 314 such that the force generated by the driving of the front wheels and the force generated by the driving of the rear wheels balance with each other. As in an example shown in FIG. 16, for example, the control portion 309 drives the right front drive wheel 301 and the left front drive wheel 302 rearward and drives the right rear drive wheel 303 and the left rear drive wheel 304 forward. In other words, the servomotors 311 to 314 are driven such that the force F1 generated by the driving of the right front drive wheel 301, the force F2 generated by the driving of the left front drive wheel 302, the force F3 generated by the driving of the right rear drive wheel 303, and the force F4 generated by the driving of the left rear drive wheel 304 balance with each other. The travel gains are examples of the "traveling gain", and the operation gains are examples of the "robot arm operation gain".

The control portion 309 is configured to drive the plurality of servomotors 311 to 314 such that the force generated by the driving of the right front drive wheel 301, the force generated by the driving of the left front drive wheel 302, the force generated by the driving of the right rear drive wheel 303, and the force generated by the driving of the left rear drive wheel 304 balance with each other within a range in which the wheels do not slip (spin) on a floor surface due to the force generated by the driving of the wheels during the operation of the right arm 22. In other words, in this case, the force generated by the driving of the right front drive wheel 301, the force generated by the driving of the left front drive wheel 302, the force generated by the driving of the right rear drive wheel 303, and the force generated by the driving of the left rear drive wheel 304 offset each other, whereby the wheels do not rotate. According to the second embodiment, the operation gains set for the plurality of servomotors 311 to 314 of the truck 1a are set to servo gains substantially equal to the travel gains. The remaining structure of the mobile robot 300 according to the second embodiment is similar to that of the mobile robot 100 according to the aforementioned first embodiment.

Processing performed by the control portion 309 of the mobile robot 300 according to the second embodiment when the control portion 309 receives an operation command is now described with reference to FIGS. 15 and 16.

Operations at steps S1 to S6 are similar to those in the aforementioned first embodiment. According to the second embodiment, the control portion 309 sets the servo gains of servo control for the right front wheel servomotor 311, the left front wheel servomotor 312, the right rear wheel servomotor 313, and the left rear wheel servomotor 314 to the operation gains at a step S7, and thereafter drives the servomotors such that resultant force obtained by combining the force generated by the driving of the wheels becomes zero at a step S21. Specifically, the control portion 309 drives the right front wheel servomotor 311 and the left front wheel servomotor 312 to drive the right front drive wheel 301 and the left front drive wheel 302 rearward, respectively and drives the right rear wheel servomotor 313 and the left rear wheel servomotor 314 to drive the right rear drive wheel 303 and the left rear drive wheel 304 forward, respectively, as shown in FIG. 16. Thereafter, the control portion 309 advances to a step S8. Operations at the step S8 and thereafter are similar to those in the aforementioned first embodiment.

As hereinabove described, also in the structure of the mobile robot 300 according to the second embodiment, the control portion 309 is configured to set the servo gains of the servo control for the truck 1a to the operation gains during the operation of the right arm 22, similarly to the aforementioned first embodiment, whereby the swing of the truck 1a resulting from reaction force generated by the operation of the right arm 22 during the operation of the right arm 22 can be suppressed while complication of the structure of the truck 1a is suppressed.

According to the second embodiment, as hereinabove described, the control portion 309 drives the right front wheel servomotor 311, the left front wheel servomotor 312, the right rear wheel servomotor 313, and the left rear wheel servomotor 314 such that the force generated by the driving of the right front drive wheel 301, the force generated by the driving of the left front drive wheel 302, the force generated by the driving of the right rear drive wheel 303, and the force generated by the driving of the left rear drive wheel 304 balance with each other during the operation of the right arm 22 and moves the right arm 22 in the state where the servo gains of the servo control for the plurality of servomotors 311 to 314 of the truck 1a are set to the operation gains, whereby the truck 1a can stay with strong force by opposing the force generated by the driving of the wheels without much increasing the servo lock force by the servo control for the servomotors 311 to 314. Thus, the swing of the truck 1a resulting from the reaction force generated by the operation of the right arm 22 can be suppressed even in the case where the servo gains for the plurality of servomotors 311 to 314 of the truck 1a during the operation are rendered equal to the servo gains during the traveling.

According to the second embodiment, as hereinabove described, the control portion 309 drives the right front wheel servomotor 311, the left front wheel servomotor 312, the right rear wheel servomotor 313, and the left rear wheel servomotor 314 such that the force generated by the driving of the right front drive wheel 301 and the left front drive wheel 302 and the force generated by the driving of the right rear drive wheel 303 and the left rear drive wheel 304 balance with each other, whereby the resultant force can be set to zero by easily opposing the force generated by the driving of the right front drive wheel 301 and the left front drive wheel 302 and the force generated by the driving of the right rear drive wheel 303 and the left rear drive wheel 304 to each other.

According to the second embodiment, as hereinabove described, the control portion 309 drives the right front wheel servomotor 311, the left front wheel servomotor 312, the right rear wheel servomotor 313, and the left rear wheel servomotor 314 such that the force generated by the driving of the right front drive wheel 301, the force generated by the driving of the left front drive wheel 302, the force generated by the driving of the right rear drive wheel 303, and the force generated by the driving of the left rear drive wheel 304 balance with each other within the range in which the wheels do not slip on the floor surface due to the force generated by the driving of the wheels during the operation of the right arm 22, whereby deviation of the reference position of the truck 1a for feedback control resulting from the driving force of the wheels can be suppressed.

According to the second embodiment, as hereinabove described, the truck 1a is configured to be movable in the anteroposterior direction, be movable in the direction intersecting with the anteroposterior direction, and be turnable, whereby the truck 1a can easily return to an original position by movement in the anteroposterior direction, movement in the direction intersecting with the anteroposterior direction, and turning even in the case where the truck 1a is swung during the operation of the right arm 22.

According to the second embodiment, as hereinabove described, the operation gains set for the right front wheel servomotor 311, the left front wheel servomotor 312, the right rear wheel servomotor 313, and the left rear wheel servomotor 314 of the truck 1a are rendered substantially equal to the travel gains, whereby it is not necessary to change the servo gains for the servomotors in switching between the traveling of the truck 1a and the operation of the right arm 22, and hence control for the servo gains can be simplified.

The remaining effects of the second embodiment are similar to those of the aforementioned first embodiment.

Modification of Second Embodiment

A modification of a second embodiment is now described. According to this modification of the second embodiment, in the structure of the mobile robot 300 according to the aforementioned second embodiment provided with the four drive wheels of the truck 1a, a disc brake employed during a standby state is further provided in each of the four drive wheels, as shown in FIG. 17.

Specifically, the disc brake including a brake rotor 305a and a brake caliper 305b is provided in each of the right front drive wheel 301, the left front drive wheel 302, the right rear drive wheel 303, and the left rear drive wheel 304. The disc brake is configured to brake the brake rotor 305a rotating along with the wheels by holding the brake rotor 305a by the brake caliper 305b. The disc brake including the brake rotor 305a and the brake caliper 305b is an example of the "mechanical brake". The remaining structure of a mobile robot 400 according to the modification is similar to that of the mobile robot 300 according to the aforementioned second embodiment.

Processing performed by the control portion 309 of the mobile robot 400 according to the modification of the second embodiment shown in FIG. 17 when the control portion 309 receives an operation command is now described with reference to FIG. 18. Operations at steps S1 to S5 are similar to those in the aforementioned second embodiment. According to the modification of the second embodiment, the control portion 309 stops the truck 1a by stopping the driving of the right front wheel servomotor 311, the left front wheel servomotor 312, the right rear wheel servomotor 313, and the left rear wheel servomotor 314 at a step S6, and thereafter activates the disc brake at a step S31. Specifically, the brake rotor 305a of each of the wheels is held by the brake caliper 305b, whereby the wheels are locked. The control portion 309 puts the truck 1a on standby at a step S32. At this time, the mobile robot 400 prepares an operation performed by the robot body 2 and is charged. In other words, according to this modification of the second embodiment, the disc brake is employed not during the operation but during the standby state. The control portion 309 releases the disc brake at a step S33. Specifically, holding of the brake rotor 305a of each of the wheels by the brake caliper 305b is released, whereby the lock of the wheels is released. Thereafter, the control portion 309 advances to a step S7. Operations at the step S7 and thereafter are similar to those in the aforementioned second embodiment.

According to the modification of the second embodiment, as hereinabove described, the control portion 309 applies the disc brake during the standby state of the mobile robot 400, releases the disc brake during the operation of the right arm 22, and moves the right arm 22 in the state where the servo gains of the servo control for the truck 1a are set to the operation gains, whereby the swing of the truck 1a resulting from the reaction force generated by the operation of the right arm 22 can be suppressed by the servo control during the operation of the right arm 22 while an increase in power consumption during the standby state is suppressed by stopping the driving of the servomotors 311 to 314 during the standby state. The remaining effects of the modification are similar to those of the aforementioned second embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the articulated robot arm has been shown as the example of the robot arm in each of the aforementioned first and second embodiments, a robot arm other than the articulated robot arm may be employed.

While the differential two-wheel drive truck has been shown as the example of the truck in the aforementioned first embodiment, a truck other than the differential two-wheel drive truck, such as a steering truck, for example, may be employed so far as the same is configured to be servo-controllable.

While the example of uniformly setting the servo gains to the same operation gains (robot arm operation gains) during the operation on any of the processing apparatuses has been shown in each of the aforementioned first and second embodiments, the robot arm operation gains different from each other according to operations may be set for the plurality of work positions where the operations different from each other are performed. In this case, the information of the robot arm operation gains according to the processing apparatuses may be previously stored as job data in the memory of the control portion. According to this structure, excessive increases in the robot arm operation gains with respect to reaction force generated during each of the operations on the processing apparatuses can be suppressed unlike the case where the same robot arm operation gains are uniformly employed during the operation on any of the processing apparatuses, and hence more suitable gains can be set for each operation.

While the example in which the single control portion controls both the wheel servomotors of the truck and the servomotors of the robot body has been shown in each of the aforementioned first and second embodiments, control portions separate from each other may control the wheel servomotors of the truck and the servomotors of the robot body.

While the example of setting the operation gains (robot arm operation gains) to the values larger than the travel gains (traveling gains) has been shown in the aforementioned first embodiment and the example of setting the operation gains (robot arm operation gains) to values substantially equal to the travel gains (traveling gains) has been shown in the aforementioned second embodiment, the robot arm operation gains may be set to values smaller than the traveling gains in the case where the floor surface is slippery or the like.

While the example in which the drive wheels include the Mecanum wheels has been shown in the aforementioned second embodiment, the drive wheels may not include the Mecanum wheels so far as the truck is configured to be movable in the anteroposterior direction, be movable in the direction intersecting with the anteroposterior direction, and be turnable. The drive wheels may include Omni wheels, for example.

While the example of driving the front wheels rearward and driving the rear wheels forward such that the force generated by the four wheels balances with each other has been shown in the aforementioned second embodiment, the front wheels may be driven forward and the rear wheels may be driven rearward such that the force generated by the four wheels balances with each other.

While the example of providing the disc brakes (mechanical brakes) in the truck has been shown in the aforementioned modification of the second embodiment, mechanical brakes other than the disc brakes may be provided in the truck.

While the example of providing one wheel servomotor for every drive wheel has been shown in the aforementioned second embodiment, one wheel servomotor may be provided for every two drive wheels, and two wheel servomotors may be provided for four drive wheels. Alternatively, in the structure of having a plurality of drive wheels, a plurality of wheel servomotors may be provided for every drive wheel. Also in these cases, the effects similar to those of the aforementioned second embodiment can be obtained if the plurality of wheel servomotors are controlled such that the force generated by the plurality of wheels balances with each other.

While the processing performed by the control portion is described, using the flowchart described in a flow-driven manner in which processing is performed in order along a processing flow for the convenience of illustration in each of the aforementioned first and second embodiments, the processing operation performed by the control portion may be performed in an event-driven manner in which processing is performed on an event basis. In this case, the processing performed by the control portion may be performed in a complete event-driven manner or in a combination of an event-driven manner and a flow-driven manner.

What is claimed is:

1. A mobile robot comprising:
a truck capable of traveling by servo control;
a robot arm mounted on the truck; and
a control portion servo-controlling traveling of the truck, wherein
the control portion is configured to set a servo gain of the servo control for the truck to a traveling gain during the traveling of the truck and set the servo gain of the servo control for the truck to a robot arm operation gain during an operation of the robot arm.

2. The mobile robot according to claim 1, wherein
the control portion is configured to set the robot arm operation gain within a range in which the truck does not slip on a floor surface due to the operation of the robot arm during the operation of the robot arm.

3. The mobile robot according to claim 1, wherein
the robot arm is configured to perform operations different from each other at a plurality of work positions, and
the control portion is configured to set the servo gain of the servo control for the truck to the robot arm operation gain according to each of the operations for each of the plurality of work positions where the operations different from each other are performed.

4. The mobile robot according to claim 1, wherein
the truck includes a plurality of servomotors driving a plurality of wheels, and
the control portion is configured to drive the plurality of servomotors such that force generated by driving of the plurality of wheels balances with each other during the operation of the robot arm and move the robot arm in a state where servo gains of servo control for the plurality of servomotors of the truck are set to robot arm operation gains.

5. The mobile robot according to claim 4, wherein
the control portion is configured to drive the plurality of servomotors such that force generated by driving of a front wheel and force generated by driving of a rear wheel balance with each other.

6. The mobile robot according to claim 4, wherein
the control portion is configured to drive the plurality of servomotors such that the force generated by the driving of the plurality of wheels balances with each other within a range in which the wheels do not slip on a floor surface due to the force generated by the driving of the plurality of wheels during the operation of the robot arm.

7. The mobile robot according to claim 4, wherein
the truck is configured to be movable in an anteroposterior direction, be movable in a direction intersecting with the anteroposterior direction, and be turnable, and
the control portion is configured to drive the plurality of servomotors such that the force generated by the driving of the plurality of wheels balances with each other during the operation of the robot arm and move the robot arm in the state where the servo gains of the servo control for the plurality of servomotors of the truck are set to the robot arm operation gains.

8. The mobile robot according to claim 4, wherein
the robot arm operation gains set for the plurality of servomotors of the truck are substantially equal to the traveling gain.

9. The mobile robot according to claim 1, wherein
the truck includes a mechanical brake restricting movement of the truck, and
the control portion is configured to apply the mechanical brake during a standby state of the mobile robot, release the mechanical brake during the operation of the robot arm, and move the robot arm in a state where the servo gain of the servo control for the truck is set to the robot arm operation gain.

10. The mobile robot according to claim 1, wherein
the robot arm includes an articulated arm portion and is configured such that the arm portion is turnable with respect to the truck, and
the control portion is configured to set the robot arm operation gain to a servo gain with which swing of the truck is substantially restored to zero by the time a turning amount of the arm portion reaches a prescribed amount when the arm portion is turned by the prescribed amount with respect to the truck to swing the truck by reaction force generated by turning of the arm portion during the operation of the robot arm.

11. The mobile robot according to claim 1, wherein
the truck includes a servomotor driving a wheel, and
the control portion is configured to set a servo gain of servo control for the servomotor of the truck to the robot arm operation gain during the operation of the robot arm.

12. The mobile robot according to claim 1, wherein
the control portion is configured to set the servo gain of the servo control for the truck to the robot arm operation gain larger than the traveling gain during the operation of the robot arm.

13. The mobile robot according to claim 12, wherein
the control portion is configured to switch the servo gain of the servo control for the truck from the traveling gain during the traveling of the truck to the robot arm operation gain larger than the traveling gain when the truck stops at a work position.

14. The mobile robot according to claim 13, further comprising a stop position detecting portion detecting that the truck has reached a stop position corresponding to the work position, wherein
the control portion is configured to determine that the truck has reached the work position on the basis of a detection result obtained by the stop position detecting portion and switch the servo gain of the servo control for the truck to the robot arm operation gain when the truck stops at the work position.

15. The mobile robot according to claim 12, wherein
the control portion is configured to set the servo gain of the servo control for the truck to the robot arm operation gain larger than the traveling gain during the operation of the robot arm and restore the servo gain of the servo control for the truck to the traveling gain after the operation of the robot arm is finished.

16. A mobile truck comprising:
a truck mounted with a robot arm and capable of traveling by servo control; and
a control portion servo-controlling traveling of the truck, wherein
the control portion is configured to set a servo gain of the servo control for the truck to a traveling gain during the traveling of the truck and set the servo gain of the servo control for the truck to a robot arm operation gain during an operation of the robot arm.

17. The mobile truck according to claim 16, wherein
the control portion is configured to set the robot arm operation gain within a range in which the truck does not slip on a floor surface due to the operation of the robot arm during the operation of the robot arm.

18. The mobile truck according to claim 16, wherein
the truck includes a plurality of servomotors driving a plurality of wheels, and
the control portion is configured to drive the plurality of servomotors such that force generated by driving of the plurality of wheels balances with each other during the operation of the robot arm and move the robot arm in a state where servo gains of servo control for the plurality of servomotors of the truck are set to robot arm operation gains.

19. The mobile truck according to claim 18, wherein
the control portion is configured to drive the plurality of servomotors such that force generated by driving of a front wheel and force generated by driving of a rear wheel balance with each other.

20. The mobile truck according to claim 18, wherein
the control portion is configured to drive the plurality of servomotors such that the force generated by the driving of the plurality of wheels balances with each other within a range in which the wheels do not slip on a floor surface due to the force generated by the driving of the plurality of wheels during the operation of the robot arm.

* * * * *